United States Patent
Gardner et al.

(10) Patent No.: US 7,275,053 B1
(45) Date of Patent: Sep. 25, 2007

(54) SURVEILLANCE AND TABLE DRIVEN REPORTING TOOL

(75) Inventors: Michael Gardner, Marietta, GA (US); Brad Snyder, Bethlehem, GA (US); Todd Zeiler, Sharpsburg, GA (US)

(73) Assignee: Cingular Wireless II, LLC, Atlanta, GA (US)

( * ) Notice: Subject to any disclaimer, the term of this patent is extended or adjusted under 35 U.S.C. 154(b) by 568 days.

(21) Appl. No.: 10/654,188

(22) Filed: Sep. 2, 2003

Related U.S. Application Data

(60) Provisional application No. 60/435,944, filed on Dec. 20, 2002, provisional application No. 60/407,071, filed on Aug. 30, 2002.

(51) Int. Cl.
 *G06F 17/30* (2006.01)
(52) U.S. Cl. .......................... 707/3; 707/10
(58) Field of Classification Search ............... None
 See application file for complete search history.

(56) References Cited

U.S. PATENT DOCUMENTS

| | | |
|---|---|---|
| 4,513,411 A | 4/1985 | Fraser |
| 5,930,476 A | 7/1999 | Yamunachari et al. |
| 5,984,178 A | 11/1999 | Gill et al. |
| 6,279,033 B1 | 8/2001 | Selvarajan et al. |
| 6,353,902 B1 | 3/2002 | Kulatunge et al. |
| 6,556,659 B1 | 4/2003 | Bowman-Amuah |
| 2002/0016829 A1 | 2/2002 | Defosse |
| 2002/0095476 A1 | 7/2002 | Craik |
| 2003/0009313 A1 | 1/2003 | May et al. |
| 2003/0140150 A1 | 7/2003 | Kemp et al. |
| 2005/0216421 A1* | 9/2005 | Barry et al. .......... 705/64 |

OTHER PUBLICATIONS

HYPERION, Hyperion Metrics Builder, product fact sheet, downloaded at http://www.hyperion.com/downloads/products/Metrics_Builder.pdf on Mar. 24, 2004.

* cited by examiner

*Primary Examiner*—Joon Hwan Hwang
(74) *Attorney, Agent, or Firm*—Gardner Groff Greenwald & Villanueva, P.C.

(57) ABSTRACT

A surveillance and reporting system (SRS) is provided that enables a user to monitor and generate reports from multiple related sources pertaining to events associated with each of these sources. The SRS is internet based, thereby providing access to remote users. The SRS also provides for identification of the sources by combining multiple databases related to each source in a tabular form in order to enable generation of complete reports and in order to enable sorting and filtering based upon more extensive source identification criteria. The SRS also accommodates changes in the underlying identification data by revising or generating up to date tables containing current identifying data for each of the multiple sources in a tabular form, thereby avoiding the need to reprogram the report procedures as a result of changes in the underlying data. The internet user may configure reports from a control panel that allows the user to select and to group multiple sources and to filter and sort data relating to the statistical performance of those sources with the most recent up to date information generated from each of the multiple sources. The reports may be in the form of tables, graphs or charts. The user also may select to receive reports by electronic mail or some other medium for convenient reference.

24 Claims, 10 Drawing Sheets

SURVEILLANCE AND TABLE DRIVEN REPORTING TOOL

CROSS-REFERENCE TO RELATED APPLICATIONS

This application claims priority to co-pending U.S. provisional application entitled "NETWORK STATUS REPORT TOOL," having Ser. No. 60/407,071, filed Aug. 30, 2002, which is entirely incorporated herein by reference. This application also entirely incorporates by reference co-pending U.S. provisional application entitled, "NETWORK STATUS REPORT TOOL," having Ser. No. 60/435,944, filed Dec. 20, 2002.

BACKGROUND OF THE INVENTION

1. Field of the Invention

The present invention relates to the field of reporting statistical data pertaining to multiple sources and events. More specifically, the present invention relates to the generation of management reports relating to the performance of related devices or entities, whose identity and relationship may change over time.

2. The Related Art

Network management reporting systems exist as relational databases to generate reports relating to multiple sources and events. The known systems allow the information pertaining to the multiple sources and events to be sorted or filtered based on a variety of criteria.

A problem that exists for these network management reporting systems is that the data pertaining to the identity of the sources may be incomplete or may change from time to time requiring the network management reporting program to be changed. Such changes may require extensive reprogramming to accommodate changes in the underlying data and extensive revision of report procedures and changes in computer programming code.

Another problem associated with network management reporting systems is that adding additional sources also may require changes in programming. Another problem of network management reporting systems is that in order to obtain custom reports, changes must be made in the programming of the report procedures to select new criteria and to enable sorting and filtering based upon these new criteria.

Programming changes are either time consuming to the database user (thereby creating an environment in which the currency or completeness of the underlying data may be questionable), or beyond the capability of typical end-user who simply wants report results. Unless the network management reporting system data can be kept up to date and complete without undue time and expense, its value as a real time or contemporaneous reporting system is severely limited.

SUMMARY OF THE INVENTION

The problems identified above, and more, are solved by the Surveillance and Reporting System (SRS) described herein. The SRS is designed to provide web based reporting of statistical data relating to real time performance of network devices within one or more network systems of different types, combined with current identifying data for each of those network devices and systems, in a table based reporting system that enables customized network reports on real time system and device performance to be generated at selected, contemporaneous intervals ("pseudo" real time performance reports). The SRS allows the same reporting process to be used for multiple statistical data sources relating to different types of network systems and devices, each configured for reporting. Statistical data for each system is retrieved, restructured and aggregated in multiple ways based on user needs and practices, and stored on a database server, where it can be linked with related identifying data for the network devices within each system, and warehoused together on a data base server in a manner available for reporting in tabular form. The data can then be retrieved separately for each linked network device or combined with other data relating to other system devices to generate reports on network system performance. The SRS enables the web user to request customized reports for each different system, including the individual or aggregated devices within the system, using common database search elements that are adapted by the SRS to generate uniform reports from each different network system from which data is collected and stored.

The SRS is configurable by select network users at the application level to enable different groups of users to establish pre-configured reports addressing specific network issues of concern to each group of users. The members of the group are then able to request specific reports within the group of pre-configured reports in order to provide a consistent, reliable reporting format of performance data to each of the user groups, such as different management levels and system engineers having a need for that information.

The SRS enables select network users to create calculated reporting results based on metrics from each statistical source. Individual users then can generate reports using both the measured statistical data ("metrics") as well as the calculated performance data as necessary by selecting desired raw and calculated performance information for each desired system in order create custom reports on system performance.

The SRS also is highly enriched by the addition of a common data source to the statistical measurement data. This common data contains information about the reported network devices usually not available in the system statistical data, that allows the combined data to be grouped by and filter on various managed areas. Engineers can thus easily and quickly set the reporting to limit the reported network devices to only the ones within their responsibility. Managers likewise can generate either higher level summary report listing the same statistics for all of the network systems, the network system for which they have responsibility, or grouped by each network device or employee within their area of responsibility.

The SRS achieves this dynamic flexibility and scalability as a result of the table driven configuration of the statistical performance and common identifying data. The table driven nature allows new sources of data to be added to the application without having to create new report pages or code new database queries for report generation. Additionally, multiple systems of the same type share the same report and column definitions. Once these report and column definitions have been established for the first system, additional systems can be added without the need to create a set of report and column definitions for each of those additional systems.

The SRS's table driven configuration data eliminates the need for constant code changes to accommodate changes in underlying statistical and common data. These changes are made in the underlying data bases and are incorporated into the stored tabular data as the stored tabular data is updated.

Additionally, prior tables may be archived to provide reference to historical data, even though the underlying data bases have been changed.

The SRS's integration between statistical data and common data enables the system to provide custom reporting based on a variety of criteria normally available in one of the underlying data bases, but not in the other underlying data base. In this manner, the flexibility of each data base is incorporated into the other data base to allow custom reporting based on a greater range of reporting criteria.

The SRS's table driven configuration also provides support for multiple data source categories and multiple types of databases from multiple data source categories, from which data is retrieved, restructured and made available for combination with common data and further custom reporting.

The SRS's table driven configuration also enables generation of multiple tables for each category, and for multiple methods for aggregation of data relating to each category.

The SRS's Web based output enables users flexibility in configuration of reports and provides multiple formats for report output. Additionally, the same report generation procedures are available for multiple types of report output.

DETAILED DESCRIPTION

Figure 1:
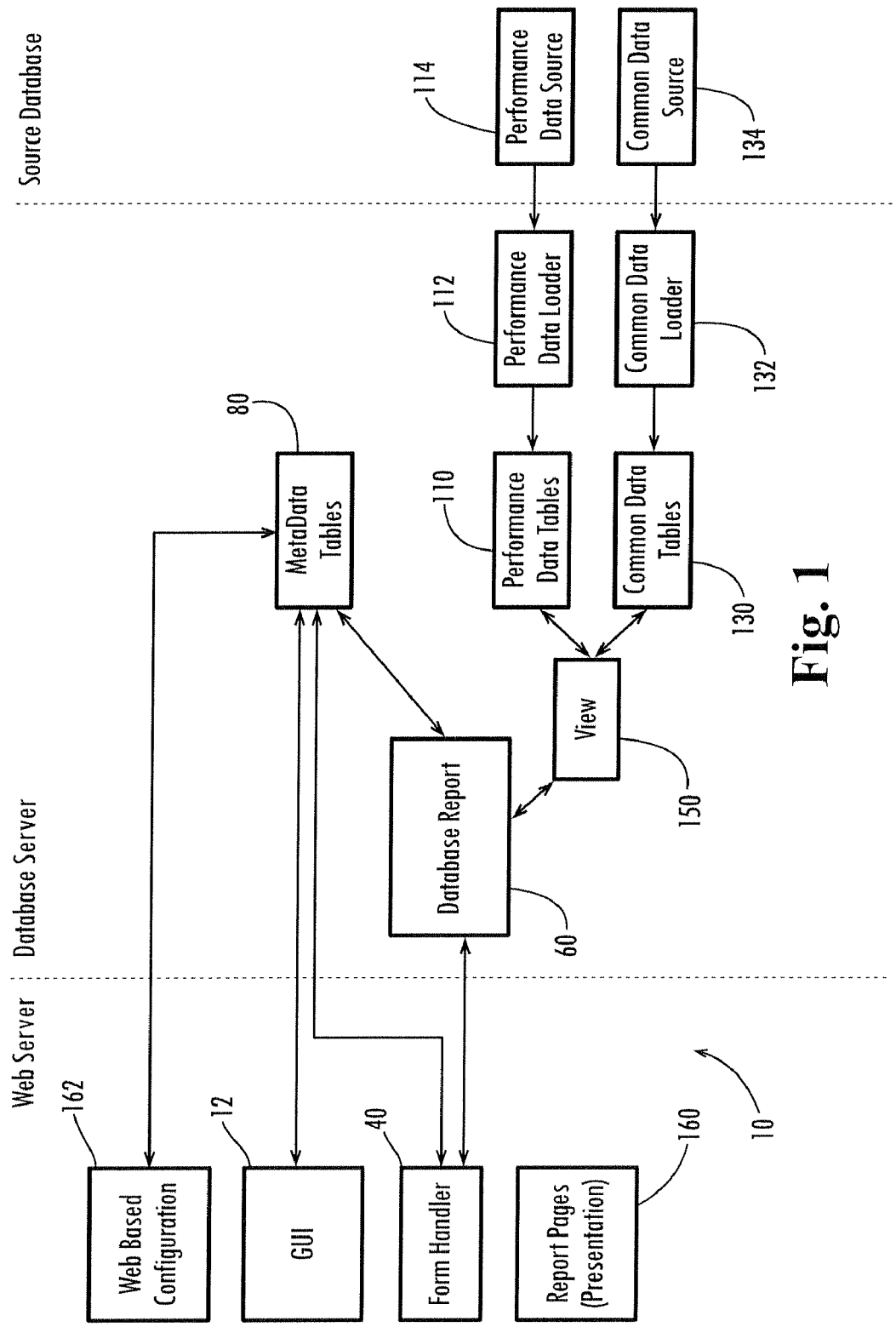
FIG. 1 is a block diagram of an exemplary surveillance and table driven reporting tool.

Referring now in more detail to the drawings, wherein like numbers refer to like parts or steps throughout the several views, FIG. 1 shows a surveillance and reporting system (SRS) 10 embodying the present invention. For purposes of illustration and not limitation, the SRS 10 shown herein is configured to provide surveillance and web-based reporting of internal-based counter data related to the south region network architecture of a wireless communication provider such as the assignee of the present application.

Figure 2:
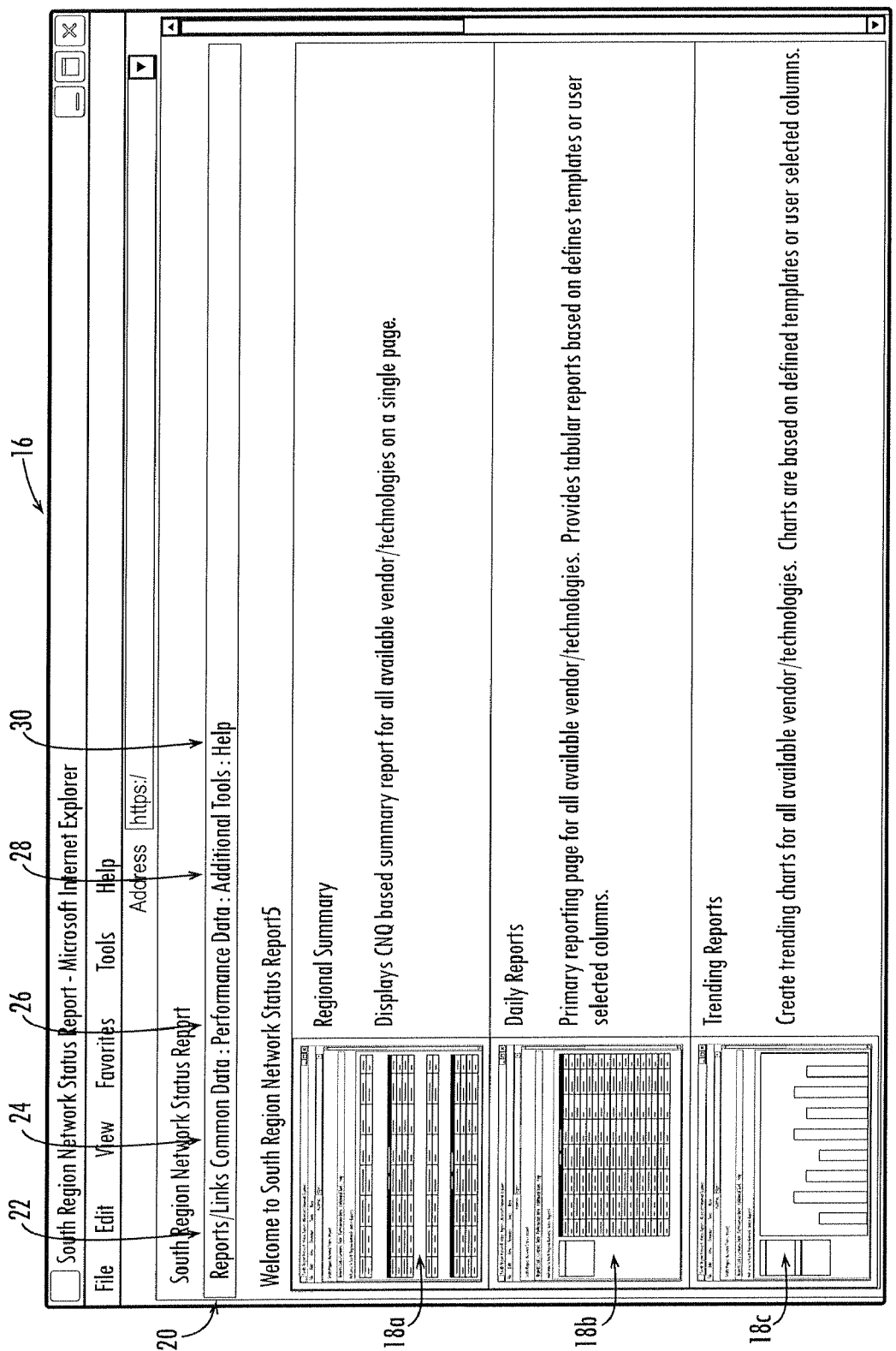
FIG. 2 is a representative HTML form accessible from the GUI of FIG. 1.

To initiate the reporting process, from the graphic user interface (GUI) 12, a user submits his or her request for an operational report through the HTML form 16 best illustrated in FIG. 2. The representative HTML form 16 provides a user the option of requesting and obtaining a pre-configured operational report 18a-c generated from a pre-selected data source category, such as but not limited to: Regional Summary, Daily Reports, Trending Reports, Delta Analysis (compare a selected metric/KPI over two date ranges), Cluster Analysis (a sector level summary report over a range of dates for a list of selected sectors), and a Daily Availability Report (show record counts for each source of data within a reporting category); or the user may configure a unique operational report 18d-e, best illustrated and described below with reference to the control panel 19 shown in FIGS. 9a and 9b, or by selecting reporting options from the table-driven menu bar 20.

The menu bar 20 report options are table driven based on MetaData content, best illustrated and described below with reference to FIG. 5. Meanwhile, the report options available from the menu bar 20 include Reports/Links 22, Common Data 24, Performance Data 26 and Additional Tools 28.

Selecting the Reports/Links 22 pull-down menu allows the user to select pre-configured operational reports 18a-c as described immediately above. In addition, this pull-down menu allows the user to access related relevant report information and functionality such as but not limited to: reports 18a-e sent via email to one or more recipients at selected intervals, regional and national site maps, and a configuration sub-menu that permits the user to organize and view reports 18a-e according to predefined functions.

Figure 6:
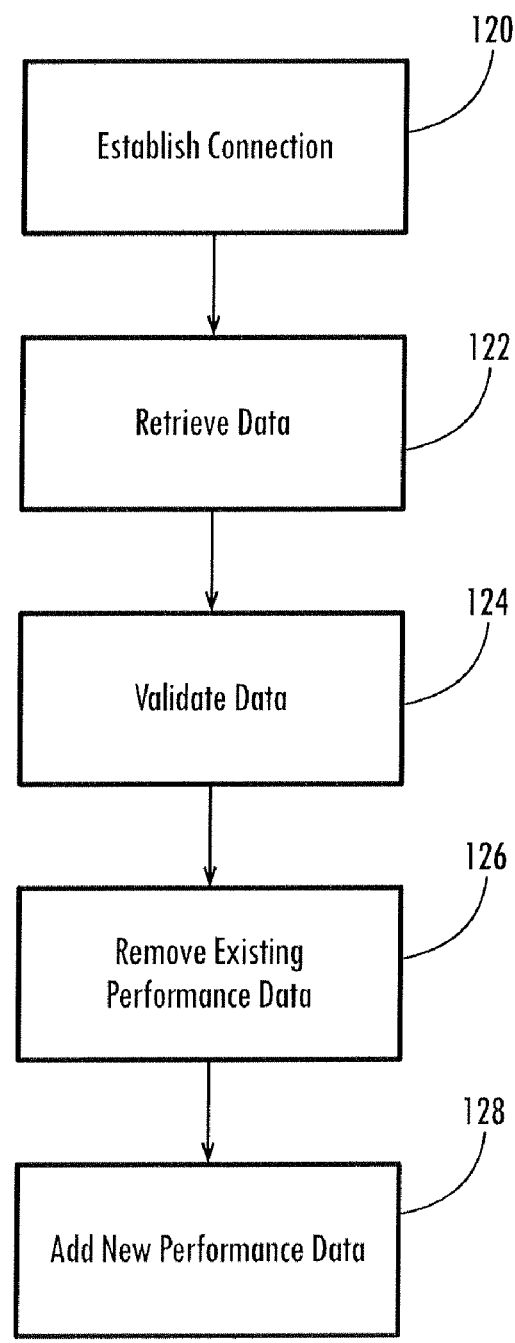
FIG. 6 is a flow chart that shows the Performance Data Loader process.
Figure 7:
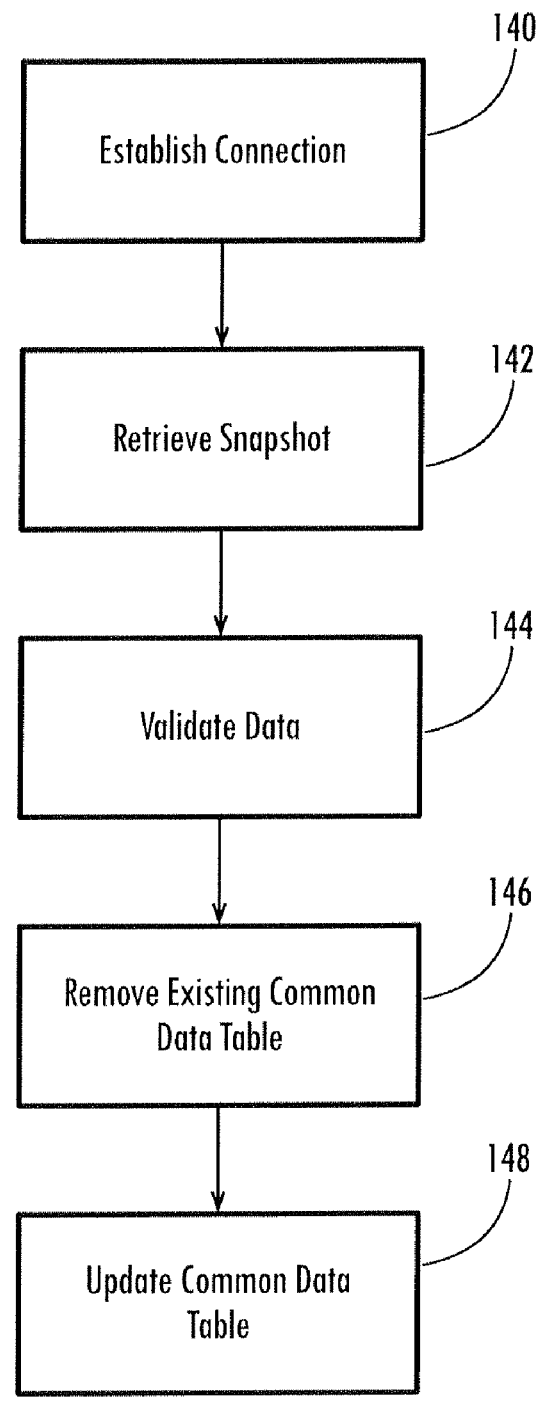
FIG. 7 is a flow chart that shows the Common Data Loader process.

The SRS 10 illustrated in FIG. 1 includes common data tables and performance data tables, best illustrated and described in detail below with reference to FIGS. 6 and 7, that separately or together are used to create all reports 18a-e. Meanwhile for the immediate purpose of describing the reports 18a-e illustrated, and not by way of limitation, common data may be summarized as the identification number, physical location, network assignment and physical attributes of each element within the exemplary wireless providers network architecture while performance data may be summarized as periodically collected real-time operational statistical data of each physical element. Further, it is assumed—but not required—that common data is updated occasionally, as elements are added, deleted or reassigned within the network; while performance data is updated on a real-time basis and retrieved and stored in the performance data tables at regular intervals.

Selecting the Common Data 24 pull-down menu allows the user to drill down and retrieve the identifying information, location or physical attributes of each element used to create the pre-configured reports, 18a-c, or to create unique reports 18d-e that directly show the location or physical attribute of selected elements. For example, some wireless provider users are likely to request reports based on location or physical attributes such as technology, vendor specific systems, commercial sectors, FCC licensed markets and states, just to list a few elements of frequent interest. Accordingly, the Common Data 24 pull-down menu may allow a user to access and view information regarding all or certain GSM or TDMA cell sites, cell systems and sites as defined by switch vendor, cell sites as defined by commercial, regulatory or geographic region, geographic regions as defined by supervising engineer, commercial markets as defined by sales manager, or any other physical attribute—or combination thereof, collected and stored regarding, in the illustrated embodiment, a wireless provider's network architecture.

Selecting the Performance Data 26 pull-down menu or selecting the Control Panel options 19 allows the user to drill down and retrieve the performance characteristics or statistical record of each element used to create the pre-configured reports 18a-c, or to create unique reports 18d-e that directly show the performance characteristic or statistical record of selected elements. For example, some wireless provider users are likely to request reports based on performance characteristics such as hourly voice call volume, busiest hour, dropped calls, text message volume, and maintenance/report records just to list a few characteristics of frequent interest. The Control Panel 19 provides options based upon the relationships of the tables contained in the MetaData tables as shown in FIG. 5, as will be discussed more fully below. Accordingly the Performance Data 26 pull-down menu or the Control Panel 19 may allow a user to access and view any performance characteristic or statistical record—or a vast array of predetermined combinations thereof, collected and stored regarding, in the illustrated embodiment, a wireless provider's network architecture.

The Additional Tools 28 pull-down menu provides the user a shortcut to drilling down and retrieving or creating unique reports for frequently requested combinations of common data and performance data. For example, selecting this pull-down menu provides some of the locations or physical attributes listed above and then selecting on a specific physical attribute provides the related performance characteristics. Accordingly, by way of example and not limitation, through the Additional Tools 28 pull-down menu a wireless provider user can select and request an operational report directed to the number of dropped voice calls per hour (performance data) for a specific switch vendor within a specific state (common data).

Help 30 pull-down menu provides the user with functionality options such as, but not limited to, browser settings, related report features such as mapping capabilities, and the email contact list.

As will be understood by those skilled in the art, one function of the SRS 10 is to provide a polished presentation of key performance indicators (KPI's) to all management and engineering users by providing relevant reports directed to specific issues. The value of the captured, recorded and stored data—the surveillance data—is highly enriched by grouping and filtering common data with performance data.

Returning FIG. 1, the Form Handler 40 on the web server creates a database procedure call statement, based on the user selected report options selected from the menus 20 or the Control Panel 19 of the GUI 12 of FIG. 2, and sends the call statement to the database server. The Form Handler 40 retrieves data from the MetaData Tables 80 to identify the appropriate tables in which the requested data is located and converts the HTML form fields into a database procedure call that gathers the specific data required to create the user requested report. One process to convert the HTML form fields is best illustrated and described with regard to FIG. 3.

Figure 3:
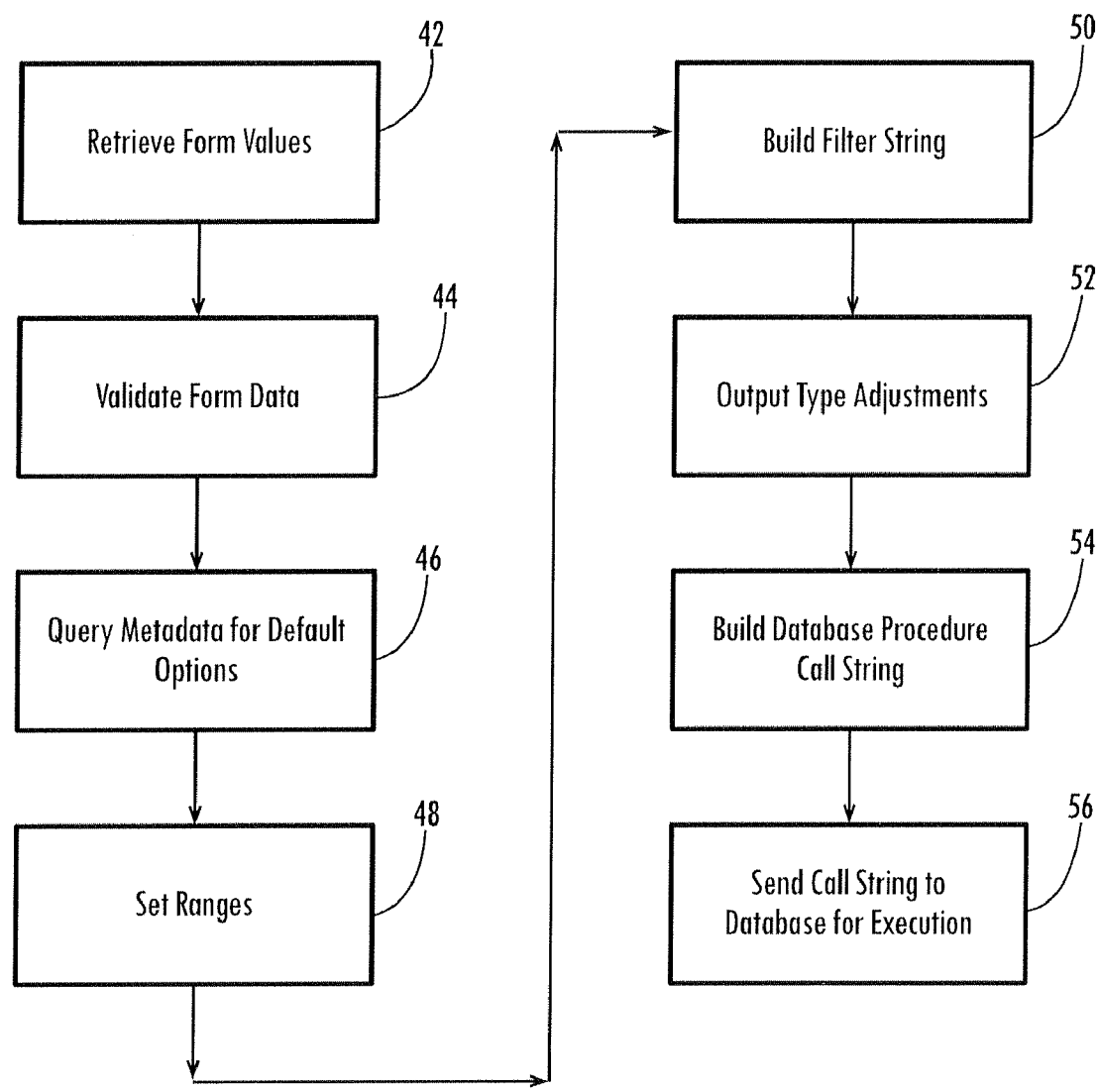
FIG. 3 is a flow chart that shows the conversion of the HTML input.

Referring to FIG. 3, Beginning with Step 42, the Form Handler 40 retrieves form variables and stores them as local variables. At Step 44, the Form Handler 40 validates the form data based on a desired set of rules. Step 46 provides for the query of the MetaData tables 80 for the default options of the requested report and Step 48 provides for the setting of the start/end data range based on time groupings and data scope. At Step 50 a filter string is built based on dimensional fields typically provided in the common data. If needed, additional filters may be provided such as a "day of week" filter. Step 52 provides final adjustments based upon the user's requested reports format; for example, a table, chart or map. At Step 54 a string is built for the database procedure call, and, if needed for the requested report format, a pivot procedure call may be appended. Step 56 sends the procedure call string to the database server for execution.

Returning now to FIG. 1, the Database Report 60 accepts the report parameters sent by the Form Handler 40. Generally speaking the Database Report 60 provides a process that, using the parameters provided by the Form Handler 40, queries the MetaData tables for all the surveillance data necessary to produce the user requested report and organizes the output. More specifically, and as described with reference to FIG. 4, using the report parameters provided by the Form Handler 40 a set of queries are built and executed against the appropriate warehoused data tables on the appropriate server. Extensive use is made of the MetaData tables to determine how to build the query as regarding which server, database, table(s), and fields have to be collected and possibly aggregated. In the example of a report that needs fields stored in different tables, separate queries may be built for each table and joined as part of a final step. This final step combines the gathered surveillance data and applies the calculations defined by the user requested parameters.

Figure 4:
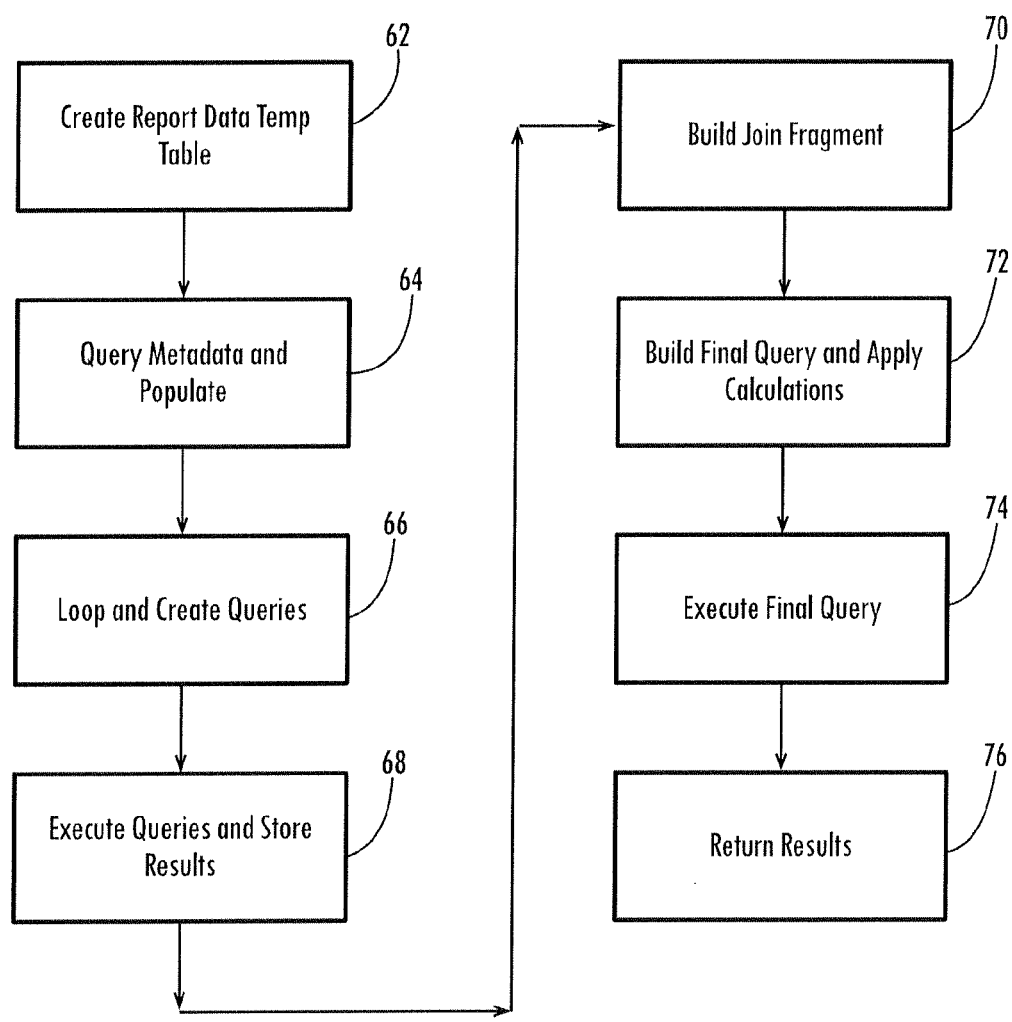
FIG. 4 is a flow chart that shows the Database Report process.

One Database Report 60 process is best illustrated and described with regard to FIG. 4. Beginning with Step 62, create a "ReportData" temp table (not shown) to contain all the surveillance data necessary to produce the requested report. At Step 64 query the MetaData tables for the relevant data and populate the ReportData table with same. Subsequent Step 66 provides for a loop through the ReportData table to again query and populate until all relevant data is collected. At Step 68 all MetaData queries are executed and the results are stored in the ReportData temp table. Step 70 provides for building the join fragments required for the temp tables. At Step 72 a final query is built using the temp table results and parameter calculations applied.

If necessary, a "DayCount" temp table for time based normalization may be built. Column creation via the GUI 12 allows the time based normalization to be applied to a metric if desired to produce an average rather than a sum when grouping reports over time. This adjusts metrics that are meaningless when summed over time, such counting the same device. This time based normalization should consider different counts in each parameter, for example grouping performance data monthly over several months has to normalize each month separately because not all months include the same number of days.

At Step 74 execute the final query created at Step 72 and, as provided at Step 76, return the results directly or in a temp table for further processing.

As indicated above, the MetaData information directed to the requested report is returned to the Database Report 60, shown in FIG. 1. The Database Report 60 process uses the MetaData information to create a custom SQL statement(s) which are executed against the appropriate server containing the surveillance data and the results are returned to the Database Report 60.

The MetaData Table Architecture 80 for the exemplary wireless provider network architecture, best illustrated in FIG. 5, will now be described. Generally speaking the MetaData tables contain the information required to generate the requested reports 18a-e. This includes information about the performance and common data, where each is located, the measured fields available for reporting, calculated fields to provide derived values for reporting and the type of pre-aggregated data available. The MetaData tables also include the report configuration information, managed by the Web Configuration Interface explained in detail below, to configure calculated metrics (columns) and reports delivered to the user. The information in the MetaData tables is used to support almost every process executed by the SRS 10. For example, the HTML form 16 populates option lists such as available categories, aggregation levels, filtering and grouping options, and defined reports and columns; the Form Handler 40 queries the MetaData tables to retrieve additional default options for the requested report not passed from the HTML Forms and to format text labels used in the report presentation; and, the Database Report 60 process uses the MetaData information to build queries that provide actual report data. Given the potentially high number of tables in a MetaData structure, views may be created to join all or portions of the MetaData structure; views facilitate the process of retrieving data while eliminating complex SQL join statements.

More specifically, the MetaData relational structure is based on a number of inter-dependent concepts. Category 82 refers to a particular type of statistical source data, and may have multiple Systems 84 and multiple Tables 86 with related key fields. System 84 is a specific instance of a category and systems of the same category type that share the same Report/Column information. Table 86 is a set of Fields 88 collected for a particular Category 82. A Field 88 refers to a raw measurement in a particular table. Further, a Table 86 may have multiple Sources 90 with different aggregation levels. Source 90 is a specific database table for a given Table 86, while scope describes the aggregation method applied to the Source 90.

Dimension 94 is a classification field used for filtering/grouping reports. The underlying dimensional data is typically geographic regions or managed areas, for example dimensional data may be logical groupings available to the performance data or political groupings within the common data. A Column 96 may be a single Field 88, or multiple Fields 88 mathematically combined. A Report 98 is a collection of Columns 96.

As indicated above, Views 100 may be used to join all or portions of the MetaData relational structure; as indicated above, views 100 facilitate the process of retrieving data while eliminating complex SQL join statements.

Returning to FIG. 1, the Performance Data 110 is collected and stored in database tables by the Performance Data Loader 112 procedures. In the exemplary SRS 10 the Performance Source Data 114 is internal based counter data for the reporting elements of interest. The Source Data 114 format may be any type of row/column data that may be loaded into a database table using one of any available methods or technologies including but not limited to ASCII text files, binary files, or database tables.

Source data is typically copied from its original location into a set of tables on the Performance Data 110 database server for reporting. While this duplication may appear redundant it allows the data to be prepared in a manner that may not be possible in its original form, including preparing additional aggregations, marrying with a paired common data source, and creating specific database indexes that may assist in faster reporting.

Internal based counter data commonly used to report performance statistics for specific elements is often reported using the fields: DateTimeStamp, Elementidentifier, Measurement-1, Measurement-2 . . . . Measurement-n. The actual field names are source dependent and stored in the MetaData. Source Data 114 measurements may be stored in multiple tables, usually separating the measurements into different types or categories.

The Performance Data Loader 112 includes a process to extract, transform and load the performance data from its Source 114 to the warehoused tables within the Performance Data 110. Generally speaking the loader process runs periodically, mirroring the rate the Source 114 produces the data to provide as near a real-time report as the performance data itself. The selection of which performance measurements within the Source 114 to load is determined by the appropriate business rules and reporting requirements set by an authorized system administrator.

The execution of the Data Loader 112 process will be dependant on the format of the source data itself. There may be provided a direct database to database connection and transfer if the source data is located in a separate database, and it may be necessary to provide manual import routines if the source data is in ASCII or binary format.

Although a specific Data Loader 112 process may vary between data sources, an exemplary process will now be described with reference to FIG. 6. Beginning at Step 120, a connection to the Performance Data source 114 is established. With Step 122 relevant data, typically associated with a parameter such as a specified time frame, is retrieved. Subsequent Step 124 validates the retrieved data for accuracy and completeness. At Step 126 the pre-existing data residing in the Performance Data Table 110, to be replaced by the retrieved data, is removed.

Step 128 provides for adding the newly retrieved data to the Performance Data Tables 110. Performance data may include logically defined classifications for filtering and grouping when married to the common data as explained below.

Generally speaking "common data" is information about the elements whose performance statistics are being reported; in the exemplary SRS 10 the elements are the components of the wireless provider's network architecture. If for example the performance data is reporting over 100 elements an hour, the common data will include a record of the physical location, network assignment and physical and operational attributes of the 100 elements.

In a preferred embodiment common data includes the same key "ElementIdentifier" field that can be used to perform and database join between the performance data and the common data. As will be understood by those skilled in the art, a database join may be implemented as a database view. Also, common data includes fields from the common data source useful for classifying, grouping, and filtering the performance data to create the reports 18*a-d*, which are typically not fields available from the performance data source 114.

Figure 5:
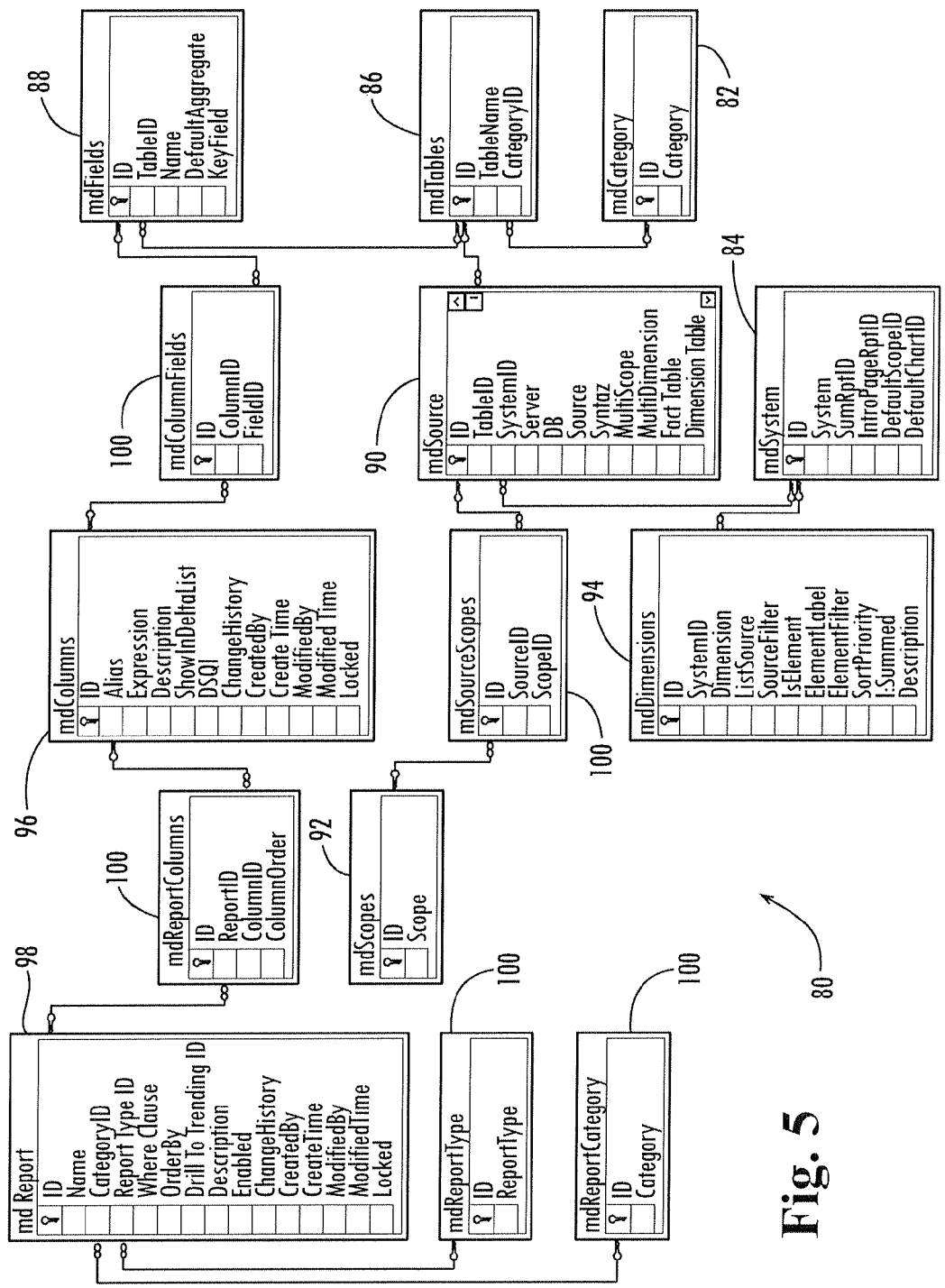
FIG. 5 is a block diagram of the MetaData Table Architecture.

Data fields used for grouping and filtering are listed as Dimension 94 fields within the MetaData Tables Architecture 80, shown in FIG. 5. This permits summary reports to be run that group the element data based on common data classifications. The available Dimension fields, presented as options for filtering and/or grouping, may be accessed and selected from the Table-driven menu bar 20 shown in FIG. 2. The user may select a filtering or grouping option based on the listing from the MetaData of available Dimensions, which when passed to the Database Report 60 is used to build the SQL query syntax. The actual groupings are defined as additional columns in the common data.

In the exemplary SRS 10 the common Data Source 134 is separate from the Performance Data Source 114. A benefit of separating these respective data source databases springs from the problem created by different naming conventions used in labeling network elements. It is known that the logical identifier of an element in the Performance Data Source 114 may change if an element is reassigned to another managing parent device for load balancing reasons. This results in an incongruity in the reported statistic, as data prior to the change may be identified by one designation and data after the change may be identified by a different designation.

Elements are often assigned a standard "Common Name" that does not change. This common name typically exists in the Common Data Source 134 but not always in the Performance Data Source 114. In marrying these two sources of data to create a report, the common name may be used to label the performance data with the same designation as the performance data is loaded into the Performance Data Tables 110. By labeling the performance data with the same designation as it is loaded, even if the ElementIdentifier in the performance data changes, consistent reporting can still be provided using the common name.

The Common Data Loader 132, best shown in FIG. 1, includes a process for updating the Common Data Tables 130. As the Performance Data Loader 112 is dependent upon the Performance Data Source 114, so is the Common Data Loader 132 dependent upon the Common Data Source 134. In the exemplary SRS 10 the Common Data Loader 132 is typically run as a periodic "most current snapshot" of the information in the Source 134.

An exemplary Common Data Loader 132 process will now be described with reference to FIG. 7. Beginning at Step 140, a connection to the Common Data Source 134 is established. With Step 142 a most current snapshot is retrieved. Subsequent Step 144 validates the retrieved data for accuracy and completeness. At Step 146 the pre-existing data residing in the Common Data Tables 130, to be replaced by the retrieved data, is removed. Step 146 provides for adding the newly retrieved data to the Common Data Tables 130.

Figure 8:
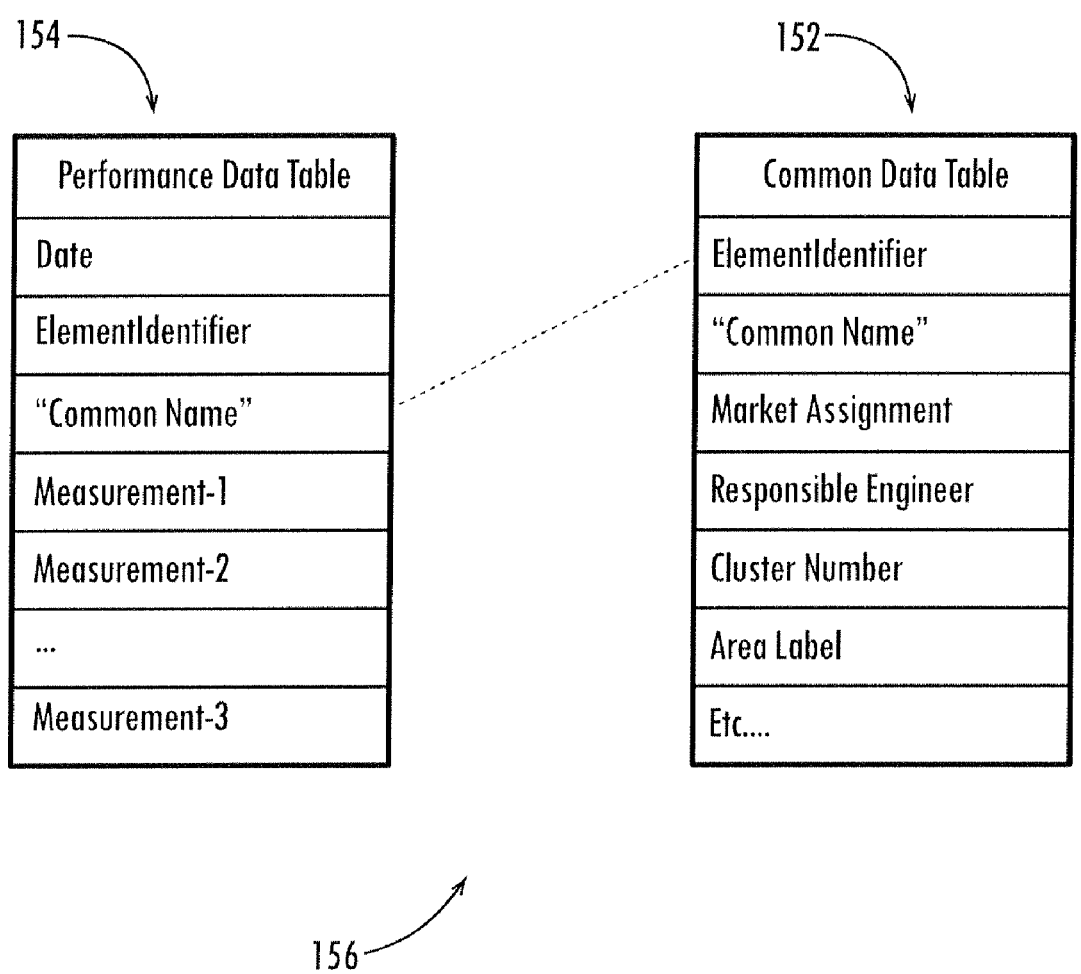
FIG. 8 is a block diagram that shows the joining of two tables.

Returning to FIG. 1, View 150 will be understood by those skilled in the art as a temporary marrying of two or more files, in this exemplary illustration a common data file and a performance data file, so that the combined files can be displayed, printed or queried. As illustrated in FIG. 8, the View result 152 has joined a Performance Data Table 154 and Common Data Table 156 by the related field ElementIdentifier.

As illustrated in FIG. 1, from the View 150 the married files are sent to the Database Report 60. The Database Report 60 process may perform additional calculations on the data as specified by the MetaData tables and passes the report data to the web server for conversion by the Report Pages 160.

Figure 9A:
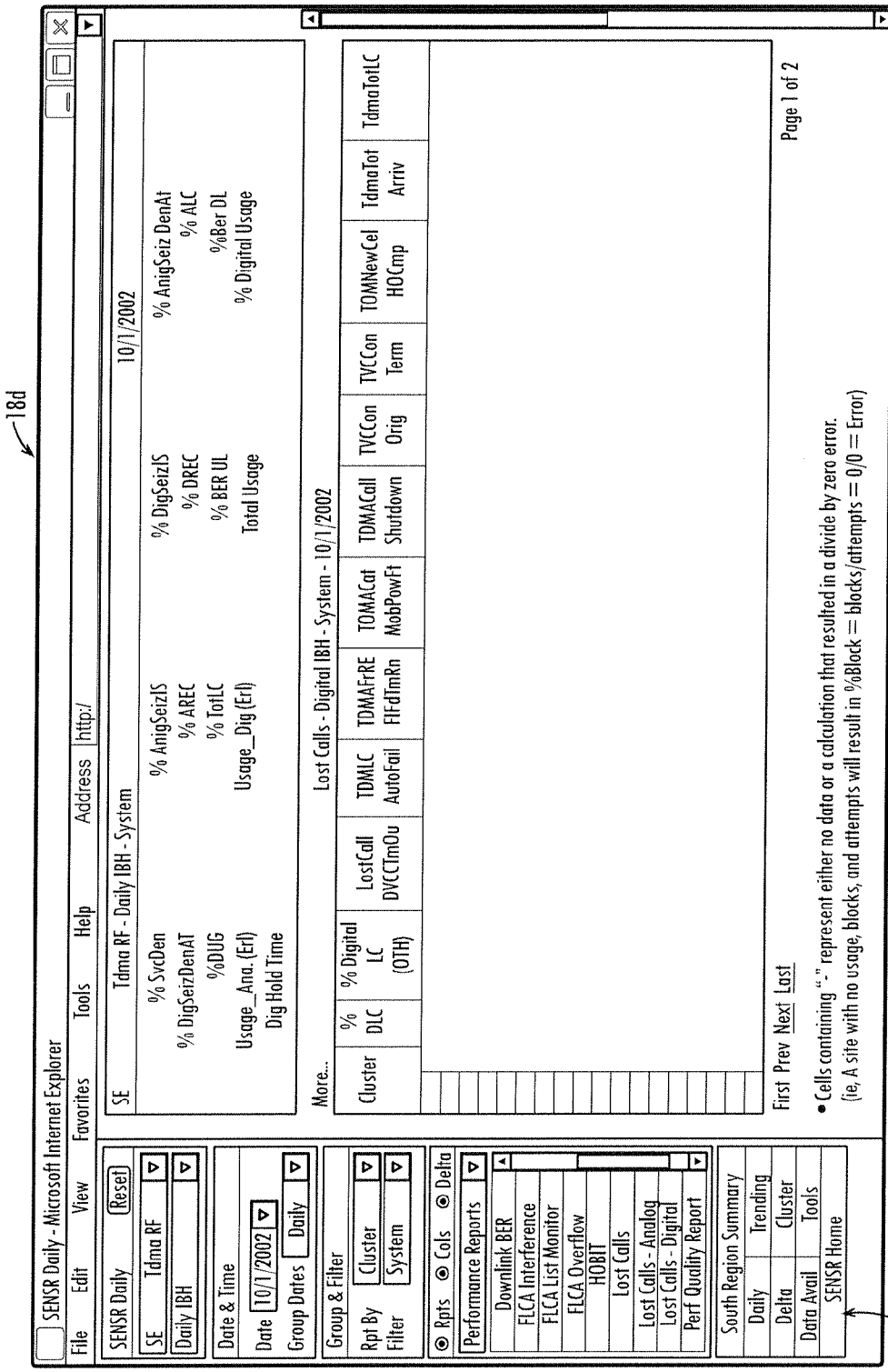
FIG. 9a is a screen shot of an exemplary tabular report.
Figure 9B:
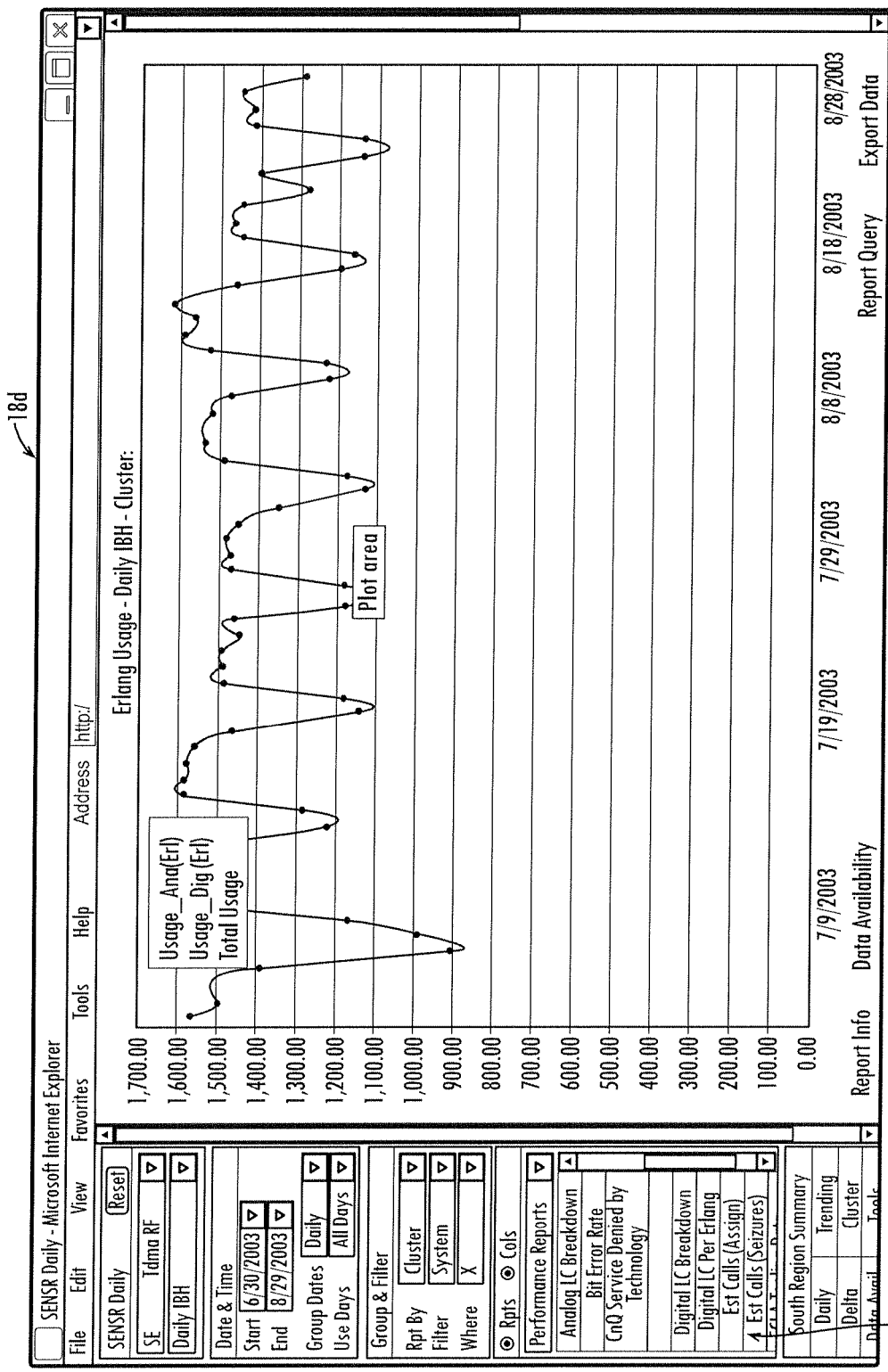
FIG. 9b is a screen shot of an exemplary trending report.

The Report Pages 160 converts the report data generated by the Database Report 60 process into a user selected presentation format. With reference to FIGS. 9a and 9b, in the exemplary SRS 10 the report data is presented as illustrated in the Reports 18e-d: a web-based frame opposite the web form (created by the user when requesting the report), which completes the basic application reporting interface.

The report output may be one of any type and output such as but not limited to a table, a chart or a map. For purposes of illustration, FIG. 9a shows report 18d as a chart directed to requested parameters, namely the individual busy hour (IBH) for all clusters within the network for the date of Oct. 1, 2002, while FIG. 9b shows a trending chart 18e of Daily IBH for a specific cluster.

Output in a table format can be used to show a list of elements, or an aggregation of a group of elements, for a given reporting period and their associated performance indicators as defined by the report within the MetaData. Tabular report content may take many different forms, based upon predefined business rules. Web-based charting and mapping can be implemented using report data and commercially available utilities.

Choice of output is determined by presentation and implementation decisions. The system and steps illustrated and described above may be used to generate the requested report output, regardless of the choice of presentation. Differences in presentation and implementation may be determined by the parameters passed to the Database Report 60 process and thus the way that query is produced. For example, output destined for a table 18d may use a single day's data, multiple elements or multiple groups of elements, and multiple measurements. By modifying the filter parameters sent to the Database Report 60 process to use multiple days instead of a single element, the trending report 18e may be produced.

The Web-Based Configuration Interface 162 may be used to manage and maintain the information with the MetaData Tables 80, or as desired, any stored data or information described or shown herein. Generally speaking there may be two sets of pages accessible from the interface 162.

One set of pages is intended for the application administrator. These pages are used to populate the necessary information within the MetaData 80 when adding a new data source—a system or category—for reporting. This may include the ability to add information to the MetaData 80 such as table location, measurement field availability, dimension and field availability, and what aggregate levels are available. The other set of pages is intended for use by a "Power User" or authorized subject matter expert with knowledge regarding the performance data for a specific category. The Power User may configure the reports and columns available for each report category to be viewed by the user. These configuration pages allow the calculated columns of the reports to be managed and maintained as tables driven by the MetaData. As new reports and/or columns are added within a configured source they can be presented and made available to the user from the HTML Form 16 or Menu 20.

In the illustrated embodiment, the MetaData structure is designed such that multiple systems of the same category share the same report and column configurations. This structure provides two advantages. First it removes duplication of effort for configuring the same KPI's and reports for multiple systems. Second, once the desired reports and columns have been defined for a system of a specific category adding subsequent systems simply requires collecting and warehousing the related performance data and common data. Since the subsequent systems are of the same category as the already configured first system, all reports and columns designed for the first are likewise available for the subsequent systems.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

It should be emphasized that the above-described embodiments of the present invention are merely possible examples of implementations, merely set forth for a clear understanding of the principles of the invention. Many variations and modification may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A system for reporting performance of a telecommunication network or portion thereof, comprising:

at least one user interface device for requesting a telecommunication network performance report and selection of a configuration of the report, the user interface device providing a first user option for requesting a first input parameter to base the report at least in part upon common data and a second input parameter to base the report at least in part upon performance data, wherein common data defines fixed properties of a set of one or more telecommunication network elements and performance data defines operational performance of a set of one or more telecommunication network elements;

a call statement module programmed to receive and convert said first and second input parameters into a database procedure call statement;

a database report module programmed to:
(i) receive said procedure call statement;
(ii) query meta-data tables comprising telecommunication network data so as to determine location of information for data responsive to said call statement;
(iii) receive from said meta-data tables the location information, and;
(iv) use the location information to retrieve data responsive to said call statement; and, a report presentation module programmed to:
(i) receive the responsive data; and
(ii) convert and output the responsive data into the requested telecommunication network performance report having the selected configuration.

2. The system of claim 1, wherein the system provides access to both (i) performance data comprising statistical measurement data, and (ii) a common data source containing common data about reported telecommunication network devices not included in the statistical measurement data, so as to permit the common data and statistical measurement data to be grouped by management areas.

3. The system of claim 1, further comprising a first data file comprising the common data for at least one telecommunication network device within said telecommunication network, and a second data file comprising the performance data for said at least one telecommunication network device.

4. The system of claim 3, wherein said common data identifies at least one of the following output parameters: physical location, technology, vendor, commercial sector, market, geographic location, related personnel, and air interface technology.

5. The system of claim 3, wherein said performance data includes values related to at least one of the following output parameters: call volume, busiest time period, quality of service, dropped calls, blocked calls, message volume, maintenance status, and report status.

6. The system of claim 3, wherein said at least one telecommunication network device comprises at least one of the following devices: switches, cell sites, and nodes.

7. The system of claim 3, wherein said database report module further comprises a processor programmed to use said location information to view said first and second data files for said responsive data.

8. The system of claim 7, wherein the system provides access to common source data regarding said at least one telecommunication network device, and said system further comprises a common data loader programmed to load said common source data into said first data file.

9. The system of claim 7, wherein the system provides access to performance source data regarding said at least one telecommunication network device, and said system further comprises a performance data loader programmed to load said performance source data into said second data file.

10. A method for reporting performance of a telecommunication network or portion thereof, comprising the steps of:

retrieving common data defining fixed properties of telecommunication network elements from a common data source;

retrieving performance data defining operational performance of telecommunication network elements from a performance data source;

storing said common data in a common data table;

storing said performance data in a performance data table;

prompting via a user interface for a report request to provide a telecommunication network performance report, the report request including a configuration request for a report configuration, a common data request to base the report at least in part upon common data, and a performance data request to base the report at least in part upon performance data;

creating a procedure call statement in response to the report request;

querying a meta-data table for location information regarding data identified by said call statement;

using said location information to create a query statement;

executing said query statement so as to select data from said data tables;

using the data selected to produce the report having said requested configuration; and outputting the produced report.

11. A method as claimed in claim 10, further comprising providing access to both (i) performance data comprising statistical measurement data and (ii) the common data source containing common data about reported telecommunication network devices not included in the statistical measurement data, so as to permit the common data and statistical measurement data to be grouped by management areas.

12. The method of claim 10, wherein the common data is retrieved from a first data file comprising the common data for at least one telecommunication network device within said telecommunication network, and wherein the performance data is retrieved from a second data file comprising the performance data for said at least one telecommunication network device.

13. The method of claim 12, wherein said common data identifies at least one of the following output parameters: physical location, technology, vendor, commercial sector, market, geographic location, related personnel, and air interface technology.

14. The method of claim 12, wherein said performance data includes values related to at least one of the following output parameters: call volume, busiest time period, quality of service, dropped calls, blocked calls, message volume, maintenance status, and report status.

15. The method of claim 12, wherein said at least one telecommunication network device comprises at least one of the following devices: switches, cell sites, and nodes.

16. The method of claim 12, further comprising using said location information to view said first and second data files for said data identified by said call statement.

17. The method of claim 16, wherein common source data regarding said at least one telecommunication network device is accessed, and a common data loader is programmed to load said common source data into said first data file.

18. The method of claim 16, wherein performance source data regarding said at least one telecommunication network device is accessed, and a performance data loader is programmed to load said performance source data into said second data file.

19. A computer-readable medium comprising computer readable instructions for reporting performance of a telecommunication network or portion thereof, said instructions, when executed, perform the steps of:

retrieving common data defining fixed properties of telecommunication network elements from a common data source;

retrieving performance data defining operational performance of telecommunication network elements from a performance data source;

storing said common data in a common data table;

storing said performance data in a performance data table;

prompting via a user interface for a report request to provide a telecommunication network performance report, the report request including a configuration request for a report configuration, a common data request to base the report at least in part upon common data, and a performance data request to base the report at least in part upon performance data;

creating a procedure call statement in response to the report request;

querying a meta-data table for location information regarding data identified by said call statement;

using said location information to create a query statement;

executing said query statement so as to select data from said data tables;

using the data selected to produce the report having said requested configuration; and outputting the produced report.

20. The computer-readable medium of claim 19, wherein the steps further comprise accessing to both (i) performance data comprising statistical measurement data and (ii) the common data source containing common data about reported telecommunication network devices not included in the statistical measurement data, so as to permit the common data and statistical measurement data to be grouped by management areas.

21. The computer-readable medium of claim 19, further comprising accessing a first data file comprising the common data for at least one telecommunication network device within said telecommunication network, and accessing a second data file comprising the performance data for said at least one telecommunication network device.

22. The computer-readable medium of claim 21, further comprising using said location information to view said first and second data files in said executing of said query statement.

23. The computer-readable medium of claim 22, wherein common source data regarding said at least one telecommunication network device is accessed, and a common data loader is programmed to load said common source data into said first data file.

24. The computer-readable medium of claim 22, wherein performance source data regarding said at least one telecommunication network device is accessed, and a performance data loader is programmed to load said performance source data into said second data file.

* * * * *